US011598532B2

(12) United States Patent
Reid et al.

(10) Patent No.: US 11,598,532 B2
(45) Date of Patent: Mar. 7, 2023

(54) RETRACTABLE DOOR FOR AN OVEN

(71) Applicant: BREVILLE PTY LIMITED, Alexandria (AU)

(72) Inventors: Harrison Eugene Reid, Hamilton (AU); John Chul-Won Lee, Telopea (AU)

(73) Assignee: BREVILLE PTY LIMITED, New South (AU)

( * ) Notice: Subject to any disclaimer, the term of this patent is extended or adjusted under 35 U.S.C. 154(b) by 540 days.

(21) Appl. No.: 16/629,015

(22) PCT Filed: Jun. 29, 2018

(86) PCT No.: PCT/AU2018/000109
§ 371 (c)(1),
(2) Date: Jan. 6, 2020

(87) PCT Pub. No.: WO2019/006487
PCT Pub. Date: Jan. 10, 2019

(65) Prior Publication Data
US 2020/0124291 A1 Apr. 23, 2020

(30) Foreign Application Priority Data
Jul. 6, 2017 (AU) ................................ 2017902647

(51) Int. Cl.
*F24C 15/02* (2006.01)
*H05B 6/64* (2006.01)
(Continued)

(52) U.S. Cl.
CPC ......... *F24C 15/022* (2013.01); *H05B 6/6417* (2013.01); *A47J 37/0664* (2013.01);
(Continued)

(58) Field of Classification Search
CPC ............ A47J 37/0664; E05Y 2900/308; E05B 15/04; F24C 15/022; H05B 2206/04; H05B 6/6417
(Continued)

(56) References Cited

U.S. PATENT DOCUMENTS 2,230,599 A * 2/1941 O'Connor ............. E05B 65/025
292/DIG. 68
4,341,409 A 7/1982 Sakoda
(Continued)

FOREIGN PATENT DOCUMENTS

CN 1428547 A † 7/2003
CN 2934968 Y 8/2007
(Continued)

OTHER PUBLICATIONS

International Search Report and Written Opinion for PCT/AU2018/00109, dated Sep. 18, 2018.
(Continued)

*Primary Examiner* — Avinash A Savani
(74) *Attorney, Agent, or Firm* — KDB Firm PLLC

(57) ABSTRACT

A cooking appliance includes a body having an interior to receive product to be cooked, the body having an opening via which the product can be moved relative to the interior; a pilot mounted within the body; and a door attached to the body to close the opening. The door includes a first latch mounted to the door and a second latch mounted to the door and independently reciprocable relative to the first latch between a first position and a second position, wherein the second latch is urged to move towards the second position such that, as the door is moved to close the opening, the second latch is received within the body and is deflected towards the first position by the pilot until a portion of the
(Continued)

second latch clears the pilot and is urged to move towards the second position to come to rest behind the pilot.

19 Claims, 21 Drawing Sheets

(51) Int. Cl.
*A47J 37/06* (2006.01)
*E05B 15/04* (2006.01)

(52) U.S. Cl.
CPC ......... *E05B 15/04* (2013.01); *E05Y 2900/308* (2013.01); *H05B 2206/04* (2013.01)

(58) Field of Classification Search
USPC ............................................ 126/197; 49/279
See application file for complete search history.

(56) References Cited

U.S. PATENT DOCUMENTS

| | | | | |
|---|---|---|---|---|
| 4,663,505 | A | * | 5/1987 | Drake .................... H01H 3/163 219/722 |
| 5,293,020 | A | | 3/1994 | Han et al. |
| 5,672,857 | A | | 9/1997 | Frost et al. |
| 2004/0182856 | A1 | | 9/2004 | Lee et al. |
| 2019/0191498 | A1 | * | 6/2019 | Hu ........................ E05F 15/616 |

FOREIGN PATENT DOCUMENTS

| | | | |
|---|---|---|---|
| CN | 201166406 Y | | 12/2008 |
| CN | 204899515 U | † | 12/2015 |
| CN | 106343785 A | | 1/2017 |
| CN | 206053603 U | | 3/2017 |
| CN | 206053603 U | † | 3/2017 |
| EP | 0 342 307 A2 | | 11/1989 |
| EP | 0 663 788 A1 | | 7/1995 |
| KR | 2000-0074891 A | | 12/2000 |
| WO | 2005038351 A1 | † | 4/2005 |
| WO | WO-2005/038351 A1 | | 4/2005 |

OTHER PUBLICATIONS

Extended European Search Report for EP 18828152.1, dated Feb. 23, 2021.
Firrst Office Action issued in Russian Patent Application No. 2020105253.
Second Office Action issued in Russian Patent Application No. 2020105253.

\* cited by examiner
† cited by third party

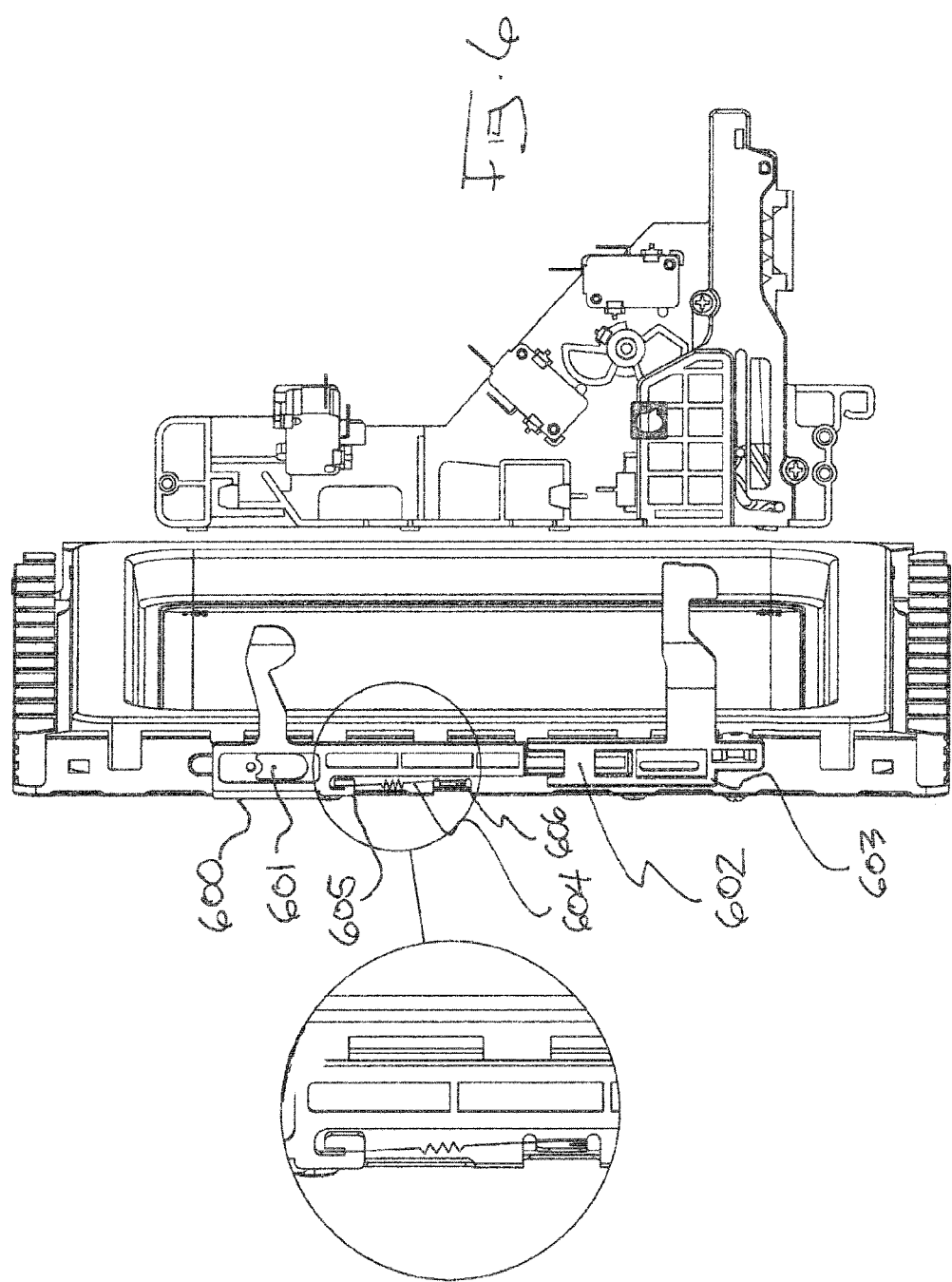

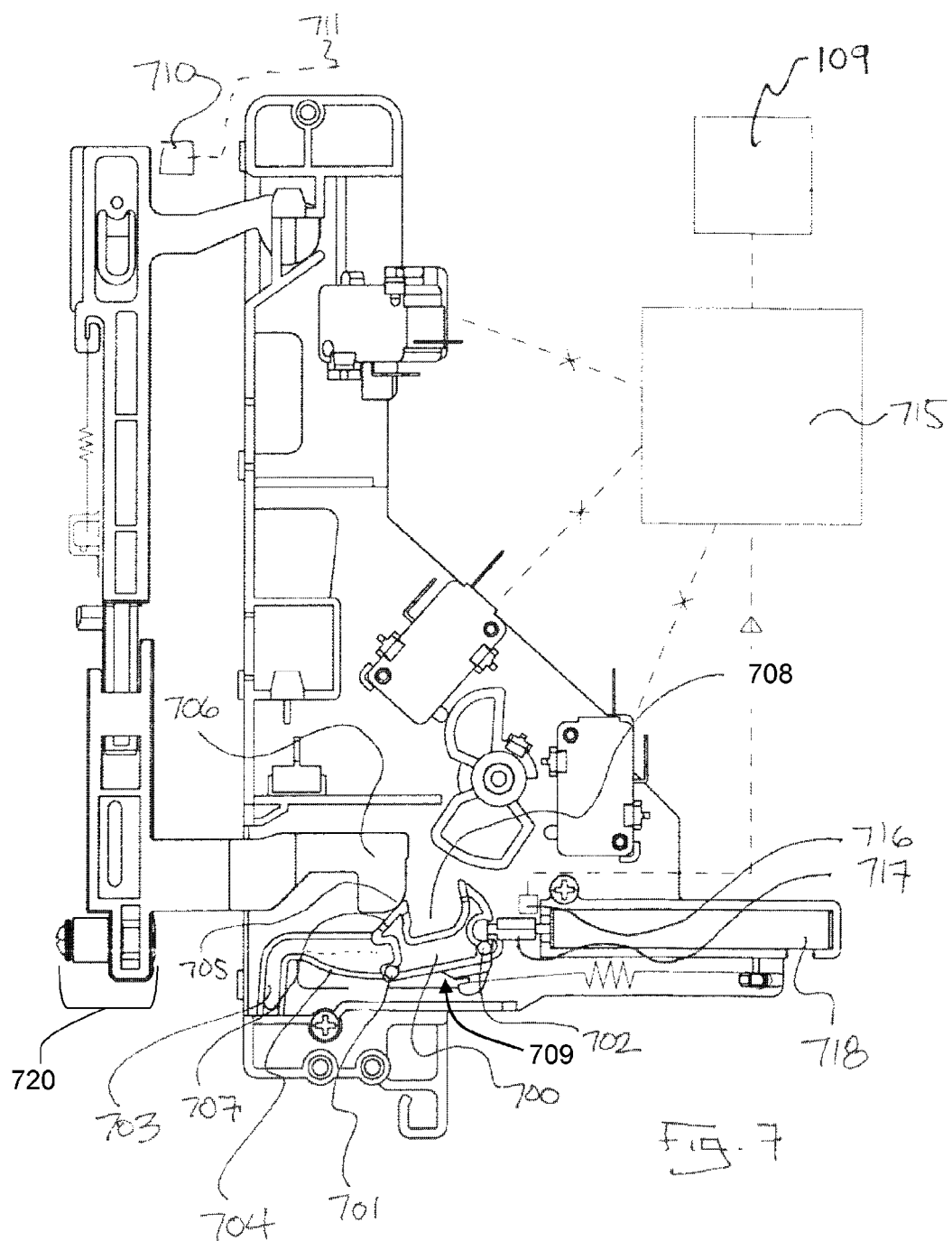

RETRACTABLE DOOR FOR AN OVEN

FIELD

The technology relates to oven doors and more particularly to a dampened retractable door for a microwave or other oven.

BACKGROUND

Soft close type oven doors utilise friction or damping elements that act against a door retraction mechanism. When a latch blade carried by the oven's door passes through a cooperating slot in the oven body, the blade is clasped and the door is drawn into closure by the dampened action of a retraction spring. Should the latch blade become disengaged from the retraction mechanism it may thereafter be impossible for a user to re-engage it. Unless re-engaged, a fault condition is generated that prevents the oven door from closing fully. As such, the oven is inoperable and must be serviced by qualified personnel.

SUMMARY OF INVENTION

It is an object of the present technology to substantially overcome, or at least ameliorate, the above disadvantage, or at least provide a useful alternative. In preferred embodiments, it would be desirable to provide a retraction mechanism for an oven door. In preferred embodiments, the mechanism includes a guide track that deflects to permit re-engagement between a latch blade and the mechanism. In other embodiments an oven door is provided having two latch blades. A lower blade is stationary and an upper blade reciprocates against a spring or bias so that the door is easier to close.

According to the invention there is provided a cooking appliance including:
a hollow body having an interior to receive product to be cooked, the body having an opening via which product to be cooked can be moved relative to the interior;
a pilot mounted within the body;
a door attached to the body to close the opening, the door including: a first latch mounted to the door; and
a second latch mounted to the door and independently reciprocable relative to the first latch between a first position and a second position, wherein the second latch is urged to move towards the second position such that, as the door is moved to close the opening, the second latch is received within the body and is deflected towards the first position by the pilot until a portion of the second latch clears the pilot and is urged to move towards the second position to come to rest behind the pilot.

Preferably, the cooking appliance further includes a retraction mechanism mounted to the body to draw the door into closure, the mechanism including:
a catch to engage the first latch; and
a profile providing a track along which the catch moves;
wherein the track is defined by a first sidewall and a second sidewall, wherein the first sidewall of the track is restorably deformable to increase the displacement between the first sidewall and the second sidewall at at least a portion of the track to orientate the catch to engage the first latch.

Preferably, the track includes:
a parking portion proximal to the opening; and a terminal portion distal to the opening,
wherein the first sidewall of the track is restorably deformable to increase the displacement between the first sidewall and the second sidewall at the terminal portion of the track.

Preferably, the catch includes a forward protrusion and a rear protrusion, the forward protrusion and the rear protrusion locating within the track to facilitate sliding movement of the catch along the track.

Preferably, the catch further includes a guide ramp opposite the first latch for ramped engagement with the first latch so that the first sidewall deforms under a load imposed by the protrusions.

Preferably, a void is provided adjacent to the first sidewall to facilitate deformation of the first sidewall.

Preferably, the catch is urged to move toward the interior of the body to come to rest at the terminal portion of the track.

Preferably, the catch further includes a recess to receive a portion of the first latch, and wherein the recess is orientated towards the portion of the first latch as the first sidewall deforms.

Preferably, the second latch is mounted to the door by a moveable bracket.

Preferably, the cooking appliance further includes a tension spring connected at one end to the moveable bracket and fixed at its other end to the door to urge the second latch to move toward the second position.

Preferably, the first latch is fixed to the door.

Preferably, the first latch is fixed to the door by a fixed bracket, wherein the moveable bracket has a leg to cooperate with the fixed bracket such that the first latch and the second latch are mechanically interconnected.

In an alternative embodiment, the first latch is independently reciprocable relative to the second latch.

Preferably, the cooking appliance further includes an interlock assembly having: a controller to monitor various safety states of the door; and a plurality of safety switches each configured to be actuated to output a switch state signal to the controller based on a respective position of the door, wherein the switches are successively actuated as the door moves to close the opening.

Preferably, the interlock assembly further includes a primary switch, a secondary switch and a monitoring switch.

Preferably, the monitoring switch is initially actuated followed by actuation of the primary switch and the secondary switch as the door moves to close the opening.

Preferably, the interlock assembly further includes a rotatable cam adjacent the monitoring switch and the secondary switch, the cam having a plurality of lobes to actuate the monitoring switch and the secondary switch upon rotation of the cam.

Preferably, a first lobe of the cam initially actuates the monitoring switch, and wherein a second lobe of the cam subsequently actuates the secondary switch as the cam rotates.

Preferably, either the first lobe or the second lobe of the cam is configured to be engaged by the first latch to rotate the cam as the door moves to close the opening.

Preferably, the primary switch is actuated by the second latch as the secondary switch is actuated by the second lobe.

BRIEF DESCRIPTION OF DRAWINGS

Exemplary embodiments will now be described with reference to the following drawing figures in which.

FIG. 6 is a side elevation of an oven door having a fixed lower latch blade and a reciprocating upper latch blade.

FIG. 7 is a schematic side elevation view of the latch blade, the interlock assembly and the retraction mechanism of FIG. 2 showing the retraction mechanism having a retraction state sensor.

DESCRIPTION OF EMBODIMENTS

Figure 1:
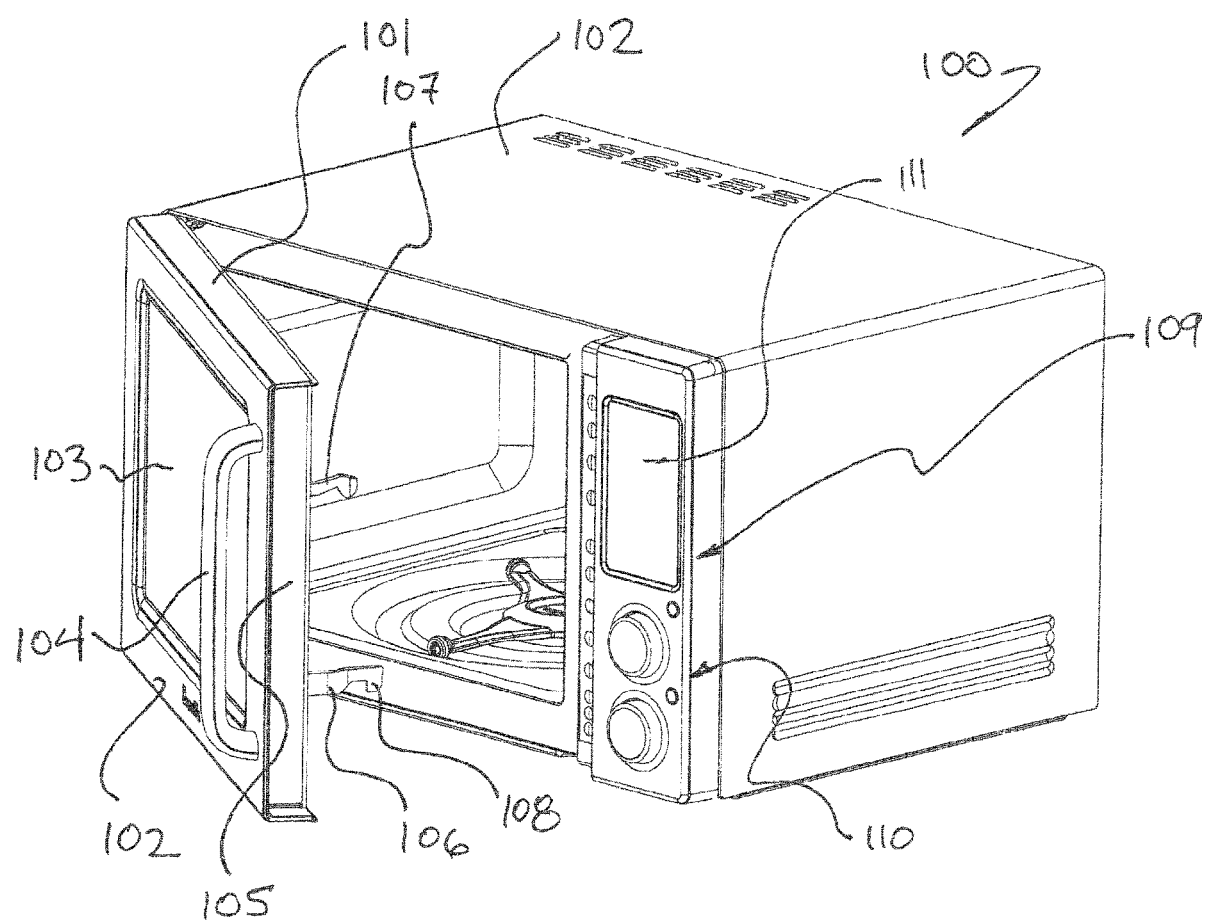
FIG. 1 is a perspective view of a microwave oven according to an embodiment.

As shown in FIG. 1, an oven such as a microwave oven 100 has a swinging door 101 attached to the main body 102 by vertical hinges (not shown). The door 101 has a frame 102 surrounding a central window 103. One vertical external edge of the frame 102 carries a handle 104. This same vertical portion of the frame 105 carries a pair of latch blades 106, 107. When the door swings closed, the latch blades 106, 107 enter the main body 102 through cooperating slots 210 (shown in FIG. 2) such that the head 108 of the lower latch blade 106 engages a retraction mechanism 200 (shown in FIG. 2) within the main body 102 of the oven 100 accessible through the slot 210. The oven 100 also has a user interface 109 having both user inputs 110 and a display 111, for example a graphic display screen.

Figure 2:
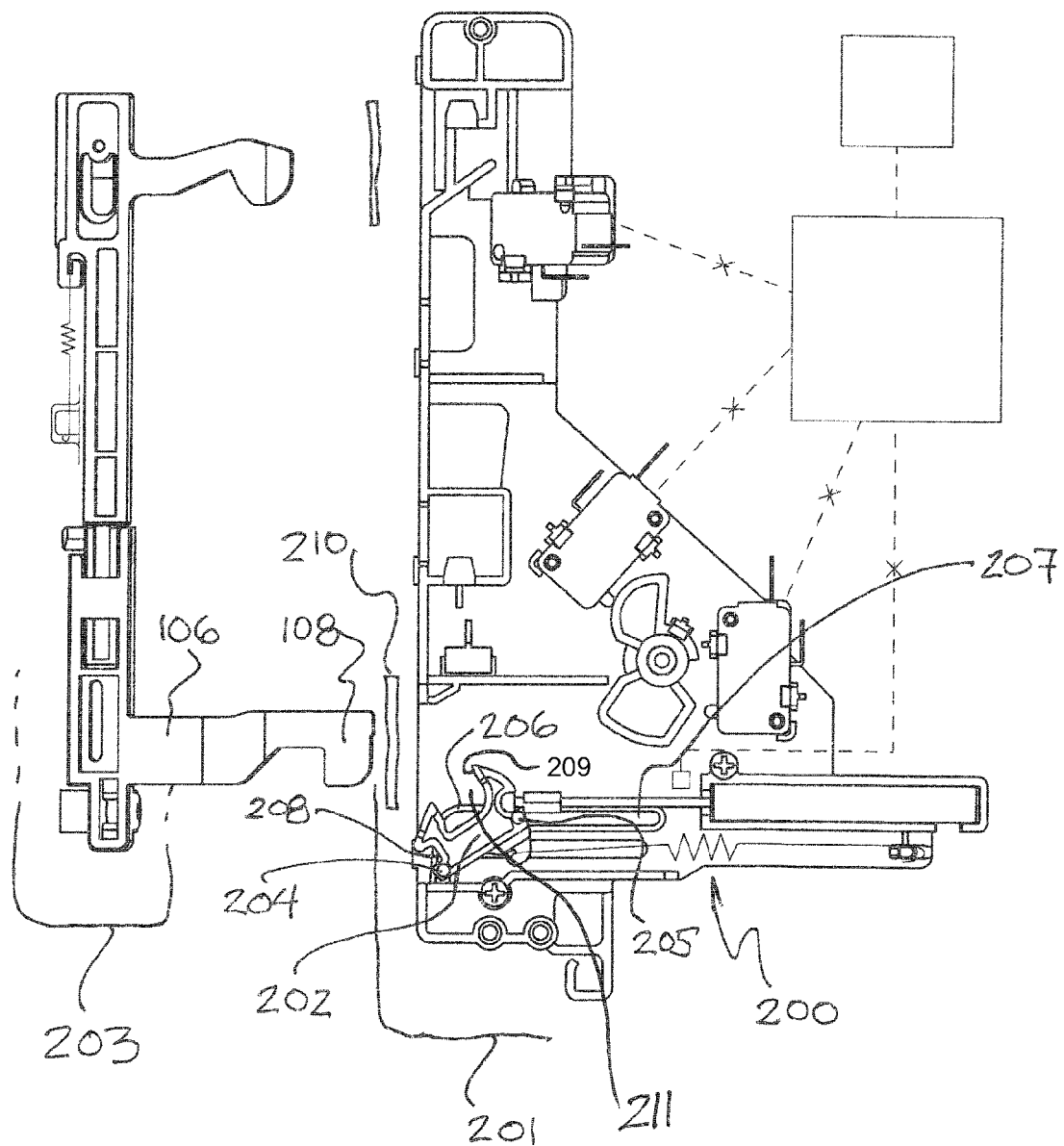
FIG. 2 is a schematic side elevation of a latch blade, an interlock assembly and a retraction mechanism for a retractable oven door of the microwave oven of FIG. 1.

As shown in FIG. 2, the retraction mechanism 200 within the oven body 201 has a moving clasp or catch 202 that receives the head 108 of the lower latch blade 106. The lower latch blade 106 is fixed within respect to the oven door 203 to which it is attached. In this example, the catch 202 is symmetrical, having similar features of each of its two faces.

FIG. 2 shows the right face of the symmetrical catch 202. The right face has a forward protrusion in the form of a forward guide pin 204 and a rear protrusion in the form of a rear guide pin 205, with the forward guide pin 204 being nearest to the door 203. The left face may be identical or substantially similar to the right face, and may also have forward and rear guide pins in the same configuration. A top portion of the catch 202 has a recess or pocket 211 for receiving the head 108 of the lower latch blade 106. The pocket 211 is defined by a front wall, a rear wall and a base extending between the rear wall and the front wall. The pocket 211 is shaped cooperatively to the head 108 of the lower latch blade 106 so that the head 108 can be received and engaged by the pocket 211.

In the example of FIG. 2, the left of a pair of similar tracks 206 is shown as being in engagement with the left side guide pins (not shown). The right track of the track pair has been removed in the Figure to show the guide pins 204, 205 of the right side of the catch 202. In this way, the catch 202 is captured for sliding motion between adjacent left and right tracks in a forward extended or parked position, in which the catch 202 is adjacent the slot 210, and a rear retracted position (see FIG. 5), in which the catch 202 is advanced toward an interior of the oven body 201. The angular orientation of the catch 202 is determined by how the guide pins negotiate the shape of the tracks 206 (and the right track). In this example, the track has a long, straight terminal portion 207 and at about a 90 degree angle, a catch tilting or parking portion of track 208. Preferably, the parking portion 208 of the track is at an angle slightly greater than 90 degrees to the terminal portion 207 to facilitate sliding motion of the catch 202 between the forward extended position and the rear retracted position. When the oven's door is being closed, the catch 202 is in the parked position depicted in FIG. 2. Because the catch 202 is inclined forward by the parking portion of the track acting on the 204 forward guide pins, frictional interference and contact with the underside of the head 108 is minimised or eliminated. By this arrangement, the catch 202 is primed, or "parked", to releasably receive the head 108 of the lower latch blade 106. In this position, the angular orientation of the catch 202 is termed the opening angle and is measured with reference to the angle between a longitudinal central axis of the terminal portion 207 and the inner face of the front wall of the pocket 211. Preferably, the minimum opening angle is about 105 degrees for the catch 202 to releasably receive the head 108 of the lower latch blade 106. This arrangement with the forward guide pins located in the parking portion 208 provides sufficient friction for the catch 202 to remain in the parking portion 208 under a bias in the direction toward the interior of the oven body 201.

In preferred embodiments, contact between the head 108 and the catch 202 is practically eliminated until the head 108 contacts the catch's trigger 209. Here, the trigger 209 is an extension of the rear sidewall of the catch's pocket 211. Contact with the trigger 209 tends to rotate the catch 202 about the rear guide pins 205. This brings the pins 204, 205 into alignment with the terminal portion 207, thereby orientating the pocket 211 of the catch 202 to capture the head 108 of the lower latch blade 106 to provide engagement therebetween. This position where the pocket 211 of the catch 202 is orientated to couple with the head 108 of the lower latch blade 106 is termed the engaged position.

Figure 3:
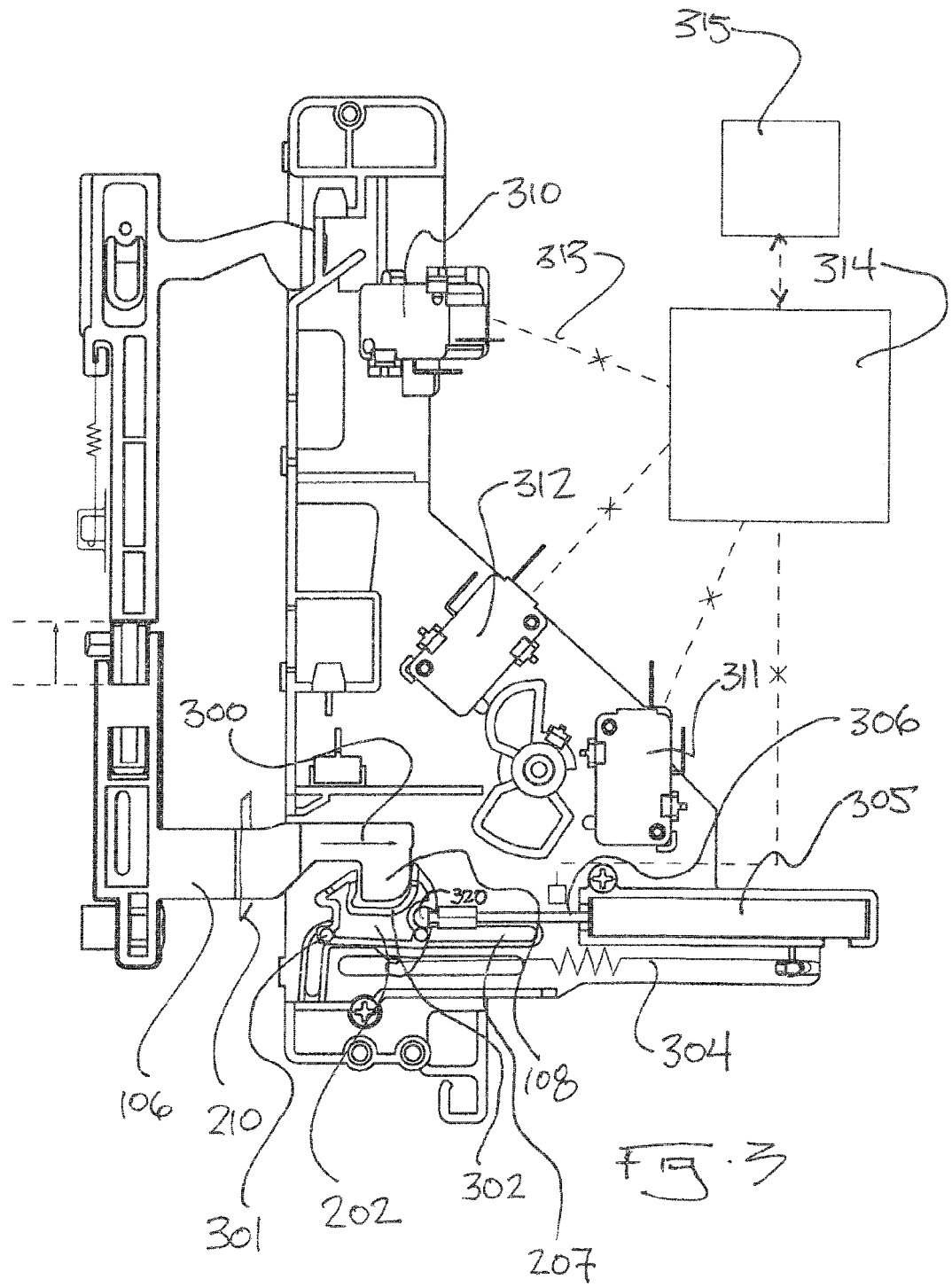
FIG. 3 is a schematic side elevation of the latch blade, the interlock assembly and the retraction mechanism of FIG. 2 showing a catch of the retraction mechanism engaged with the latch blade.

As shown in FIG. 3, further insertion of the latch blade 106 through the slot 210 causes the catch 202 to both advance 300 toward the interior of the oven body 201 and complete the rotation of the catch 202 into the engaged position. This rotation also causes the head 108 to be trapped in the recess/pocket 302 of the catch 202. In this position, the angle between the longitudinal central axis of the terminal portion 207 and the inner face of the front wall of the pocket 302 is typically about 85 degrees to 90 degrees, preferably 88 degrees. The pocket 302 has a curved rear edge corresponding to the curved front edge of the head 108. The high point of the rear edge forms the trigger 209.

With both the forward guide pin 301 and the rear guide pin locating the terminal portion 207, the catch 202 and the lower latch blade 106 engaged by the pocket 302 slide along the terminal portion 207 of the track 206 into the interior of the oven body 201 under bias, thereby closing the oven door 203. Because all of the catch's guide pins are in the same line of motion in the terminal portion 207 of the track, the retraction force exerted by a tension spring 304 works to retract both the catch 202 and the latch blade 106 engaged in the pocket 302 of the catch 202. The force of the spring 304 is resisted by a dampening element in the form of a damping cylinder 305 that is attached to the catch 202 by a shaft 306 by a flexible or ball joint 320.

The oven door arrangement depicted in FIG. 3 has an interlock assembly including three safety switches being a primary switch 310 a secondary switch 311 and a tertiary or monitoring switch 312. In the first engagement position depicted in FIG. 3, the head 108 is captured but neither the primary 310, secondary 311 nor the tertiary 312 safety switches have been tripped or activated.

Each switch 310, 311, 312 provides a switch state signal 313 to the device's microprocessor or controller 314. The controller 314 monitors the various safety states of the door in response to the output of the three switches 310, 311, 312. The processor also monitors and controls other oven functions. The processor 314 receives data from a user interface 315 and may provide signals to that interface 315 for the purpose of driving a display, audible or visible alarms or other user pertinent data.

Figure 4:
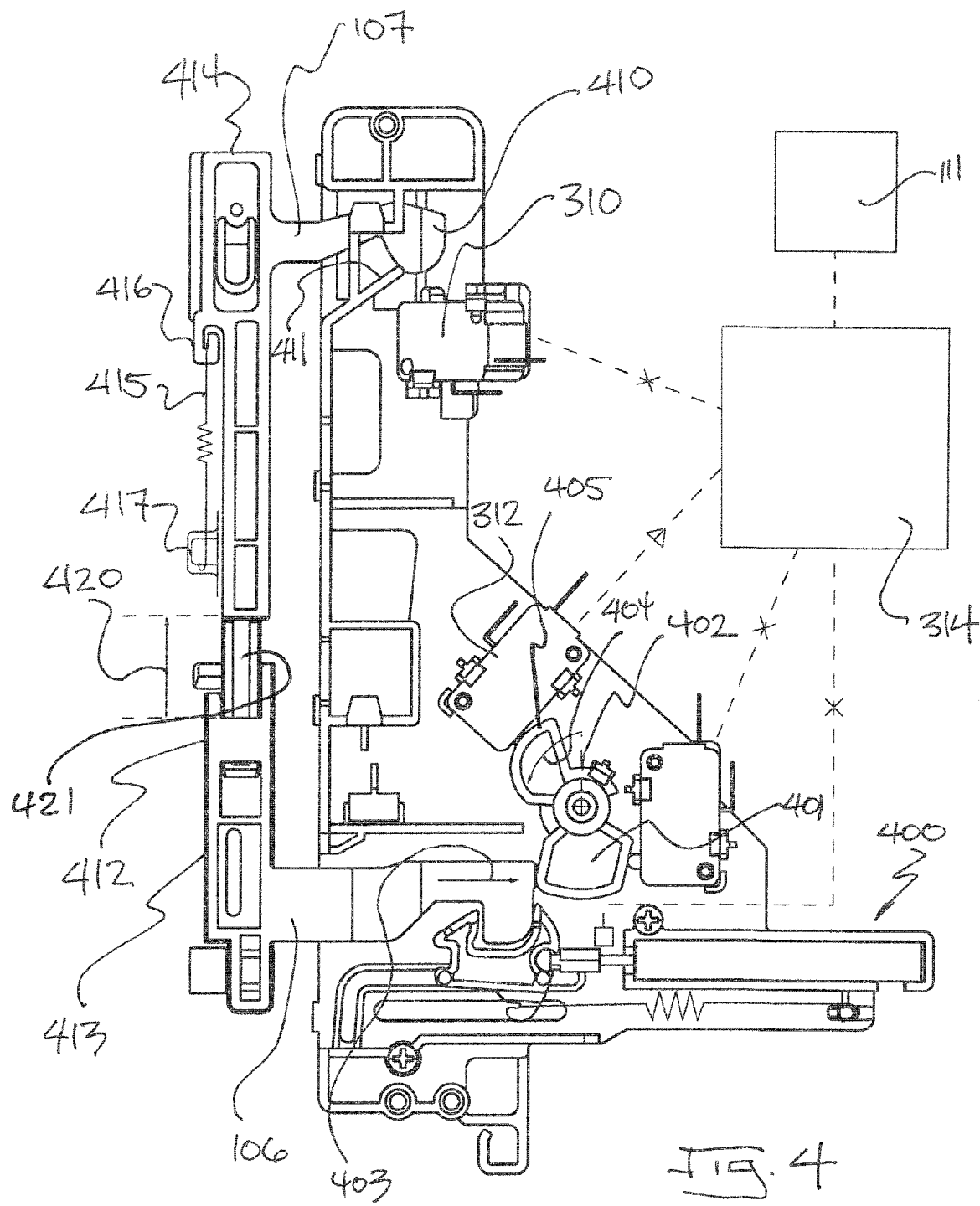
FIG. 4 is a schematic side elevation of the latch blade, the interlock assembly and the retraction mechanism of FIG. 2 showing the latch blade in a partially retracted position whereby a switch of the interlock assembly is actuated.

As shown in FIG. 4, the action of the retraction mechanism 400 causes a front surface of the latch pin 106 to contact one lobe 401 of a rotating cam 402. The inward motion 403 of the blade 106 causes a counter clockwise rotation 404 of the cam 402. This causes a second lobe or portion 405 to make engagement or contact with the tertiary switch 312. This is detected as a change of switch state by the processor 314. When the tertiary switch 312 is activated, the primary switch 310 has yet to be activated by the upper latch blade 107. As the head 410 of the upper latch blade 107 enters the interior of the oven, an underside of the head 410 rides up an inclined pilot, ramp or surface 411 that is located between the adjacent slot in the oven body and the switch 310. The head 410 is carried by an upper bracket 414 that reciprocates against the bias of a tension spring 415.

As suggested by FIG. 4, the fixed lower latch blade 106 and reciprocating upper latch blade 107 are mechanically interconnected and consequently aligned for reciprocating sliding motion by guide features 412 formed on a lower bracket 413 that carries the lower latch blade 106. The upper latch blade 107 is carried by a moveable or sliding bracket 414. The moveable bracket has a leg 421 that cooperates with the guidance and alignment features 412 of the lower bracket 413. The vertical sliding motion between the upper and lower brackets is resisted by the tension spring 415 that extends between a hook or opening 416 formed on the upper bracket 414 and a fixed point 417 located away from the upper bracket, for example on the body or chassis of the oven. The resulting arrangement provides a limited and fixed range of motion 420 where the upper and lower brackets 414, 413 are still interconnected.

Figure 5:
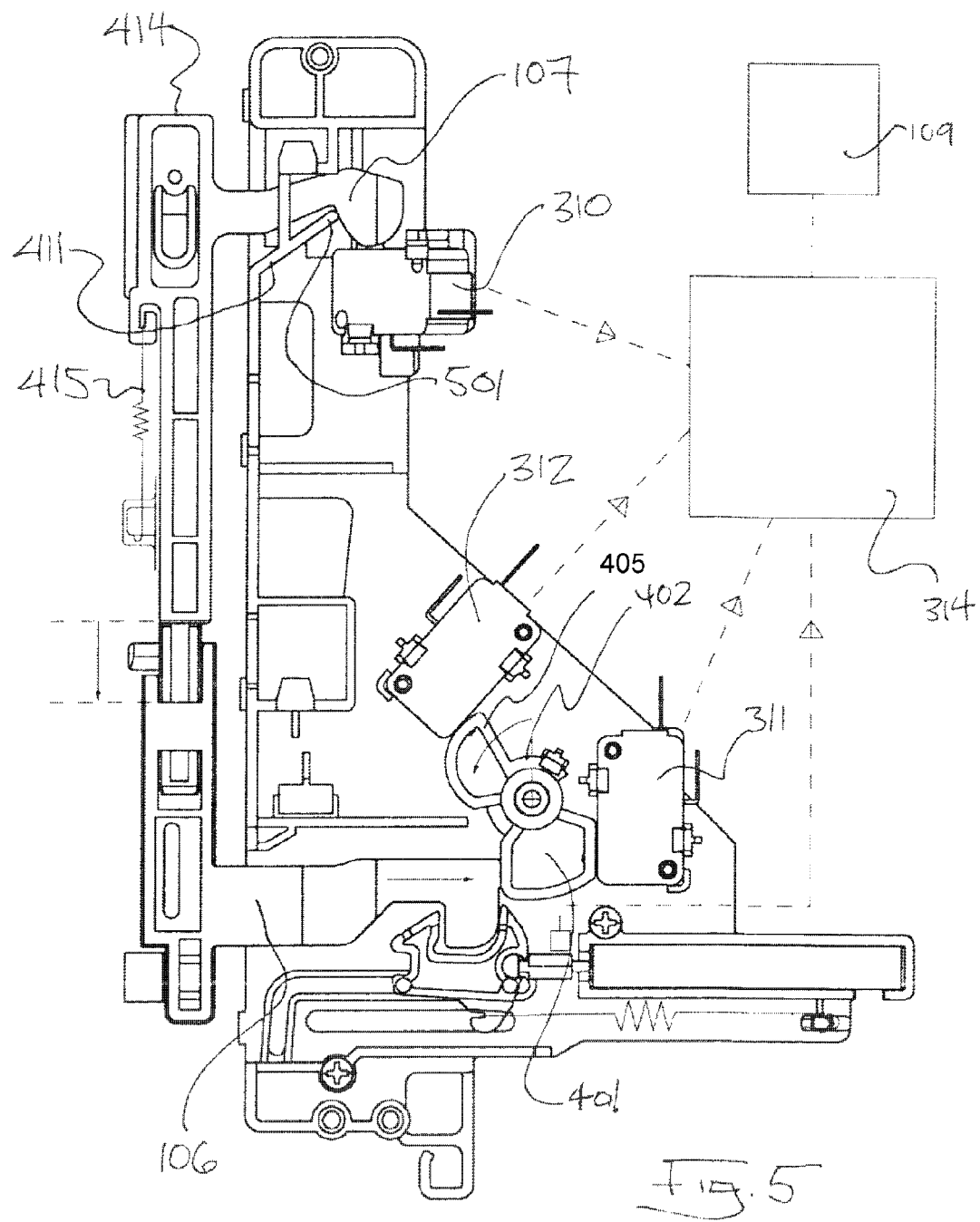
FIG. 5 is a schematic side elevation of the latch blade, the interlock assembly and the retraction mechanism of FIG. 2 showing the latch blade in a fully retracted position whereby all the switches of the interlock assembly are actuated.

As shown in FIG. 5, when the upper and lower latch blades 107, 106 are fully inserted, the oven door carrying them is considered fully closed. In this orientation, the second lobe 405 makes contact with the tertiary switch 312. In this position, the upper bracket 414 has been drawn down by the tension spring 415, past the upper lip 501 of the pilot or ramp 411. Then subsequently lobe 401 of cam 402 makes contact with secondary switch 311 while at the same time the upper latch blade 107 makes contact with the primary switch 310.

As shown in FIG. 6, the reciprocating upper bracket 600 is guided for vertical motion by an upper guide 601 and guidance provided by the engagement 602 between the upper bracket and the lower bracket 603. The tension spring 604 resists the vertical motion of the upper bracket is held between a hook 605 formed on the upper bracket and a fixed attachment point 606 located on an internal chassis component, frame or fixing point.

Figure 6A:
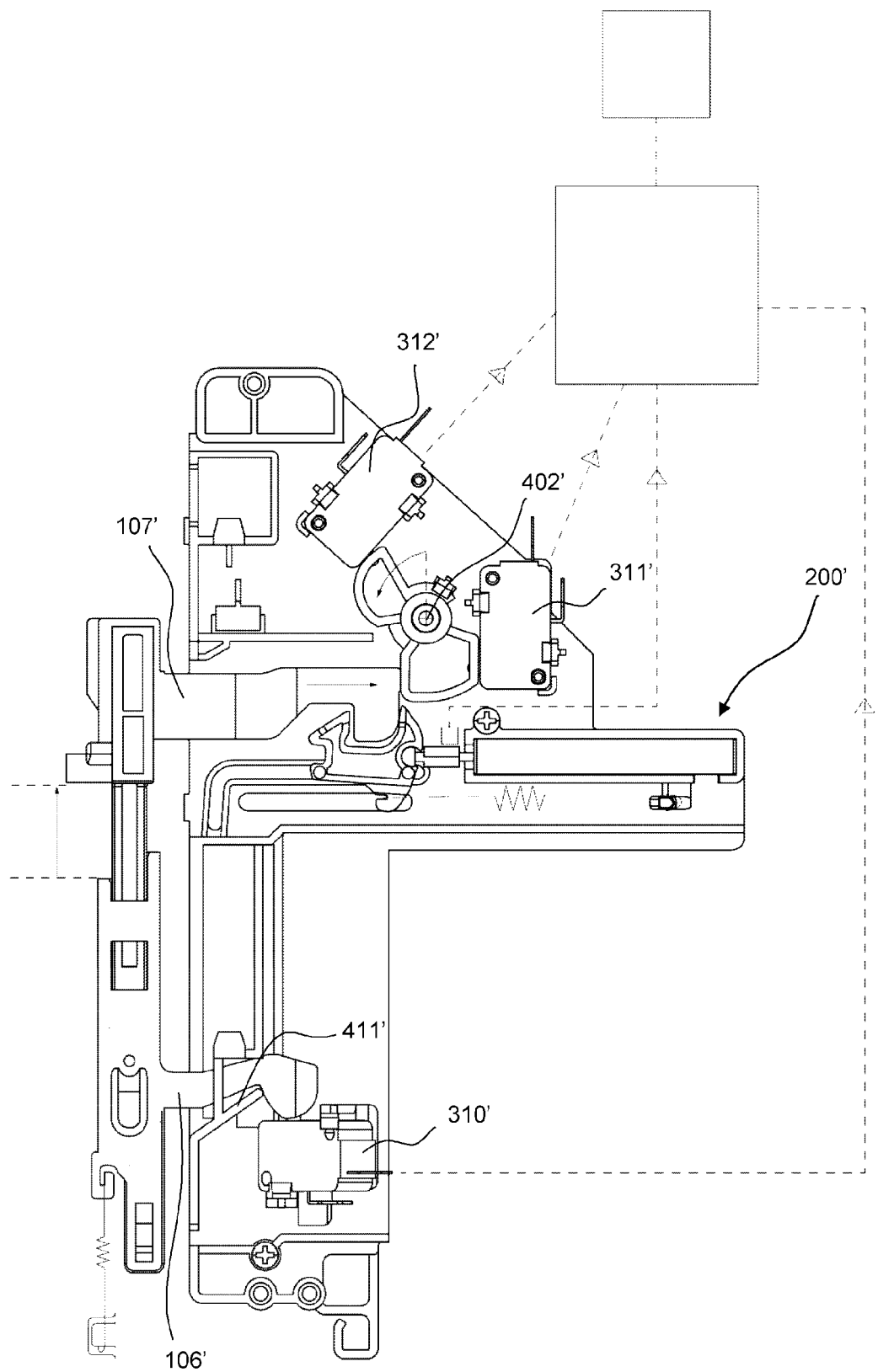
FIGS. 6a-e are schematic side elevations of a latch blade, an interlock assembly and a retraction mechanism for a retractable oven door of a microwave oven according to alternative embodiments.

As shown in FIG. 6a, it will be appreciated that the arrangement of the upper and lower latch blades 107, 106, the retraction mechanism 200 and the switches 310, 311, 312 as depicted in FIG. 5 may be interchanged such that the upper latch blade 107' cooperates with the retraction mechanism 200' and the cam 402', which in turn contacts the secondary and tertiary switches 311', 312' while the lower latch blade 106' rides up the ramp 411' and contacts the primary switch 310'. In this arrangement, it can also be envisaged that the upper latch blade 107' is fixed and the lower latch blade 106' reciprocates in the same manner as the upper latch blade 107.

Figure 6B:
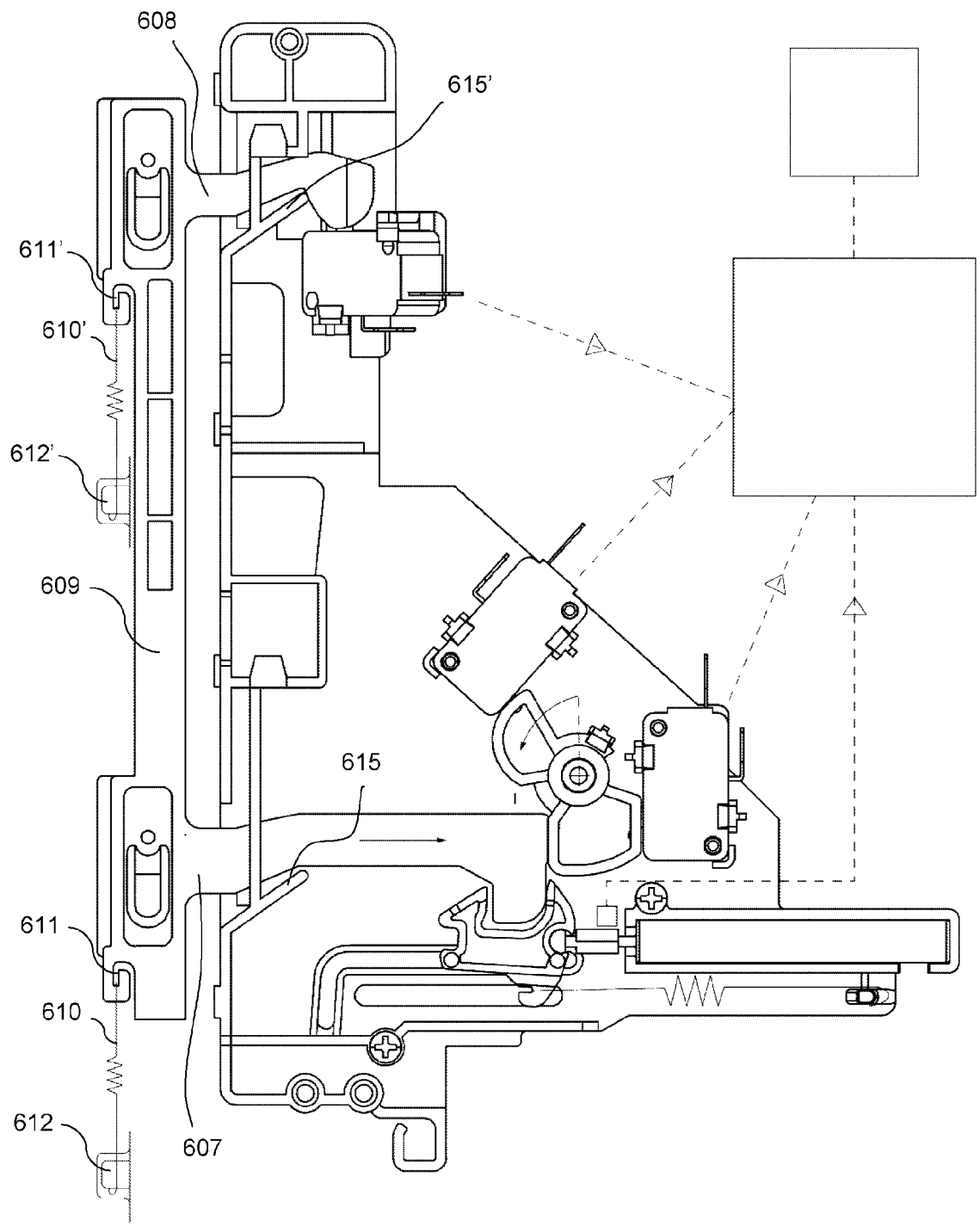

In another embodiment depicted in FIG. 6b, the lower latch blade 607 and the upper latch blade 608 are mechanically interconnected by a common bracket 609 and consequently aligned for reciprocating sliding motion over respective inclined pilots, ramps or surfaces 615, 615'. The common bracket 609 reciprocates against the bias of the tension springs 610, 610' extending between respective openings 611, 611' formed on the common bracket 609 and respective fixed points 612, 612' located away from the common bracket 609. In this way, the resulting arrangement enables both the lower latch blade 607 and the upper latch blade 608 to reciprocate in unison.

Figure 6C:
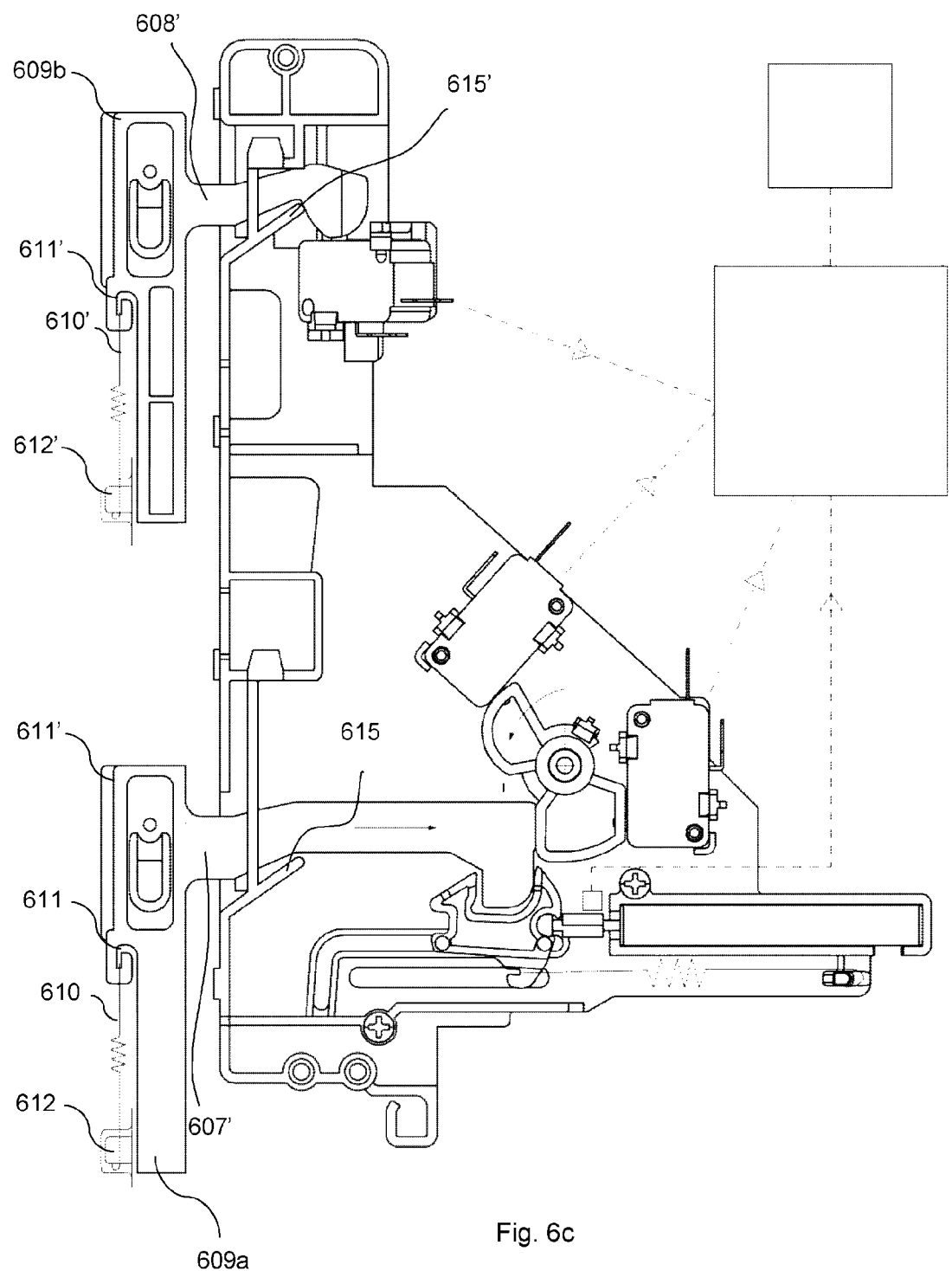

The embodiment depicted in FIG. 6c is substantially similar to the embodiment depicted in FIG. 6b except that the lower latch blade 607' and the upper latch blade 608' are not mechanically interconnected by a common bracket. Rather, the lower latch blade 607' is carried by a lower bracket 609a and the upper latch blade 608' is carried by an upper bracket 609b separate from the lower bracket 609a. Both the lower and upper brackets 609a, 609b reciprocate against the bias of the tension springs 610, 610' extending between respective openings 611, 611' formed on the lower and upper brackets 609a, 609b and respective fixed points 612, 612' located away from the lower and upper brackets 609a, 609b. In this way, the resulting arrangement enables both the lower latch blade 607' and the upper latch blade 608' to reciprocate independently of one another.

Figure 6D:
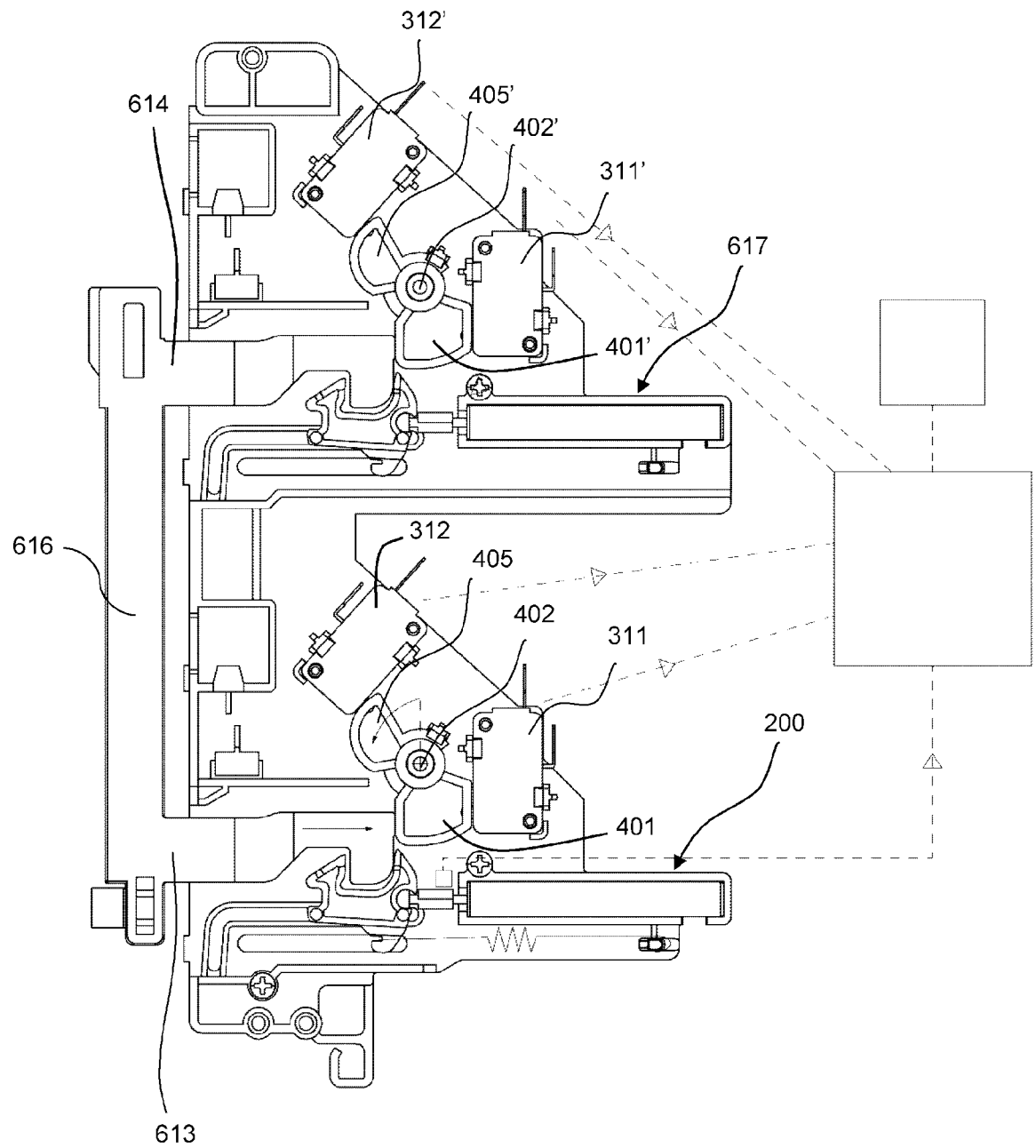

In another embodiment shown in FIG. 6d, both the lower latch blade 613 and the upper latch blade 614 are fixed and mechanically interconnected by common bracket 616. The upper latch blade 614 cooperates with a retraction mechanism 617 having substantially the same features as the retraction mechanism 200, and a cam 402' having substantially the same features as the cam 402. In this way, the first and second lobes 401', 405' of the cam 402' make contact with the secondary and tertiary switches 311', 312', respectively, in substantially the same manner as described above with respect to the first and second lobes 401, 405. In this arrangement, when the upper and lower latch blades 614, 613 are fully inserted, each of the secondary and tertiary switches 311, 311', 312, 312' are activated and the oven door is considered fully closed.

Figure 6E:
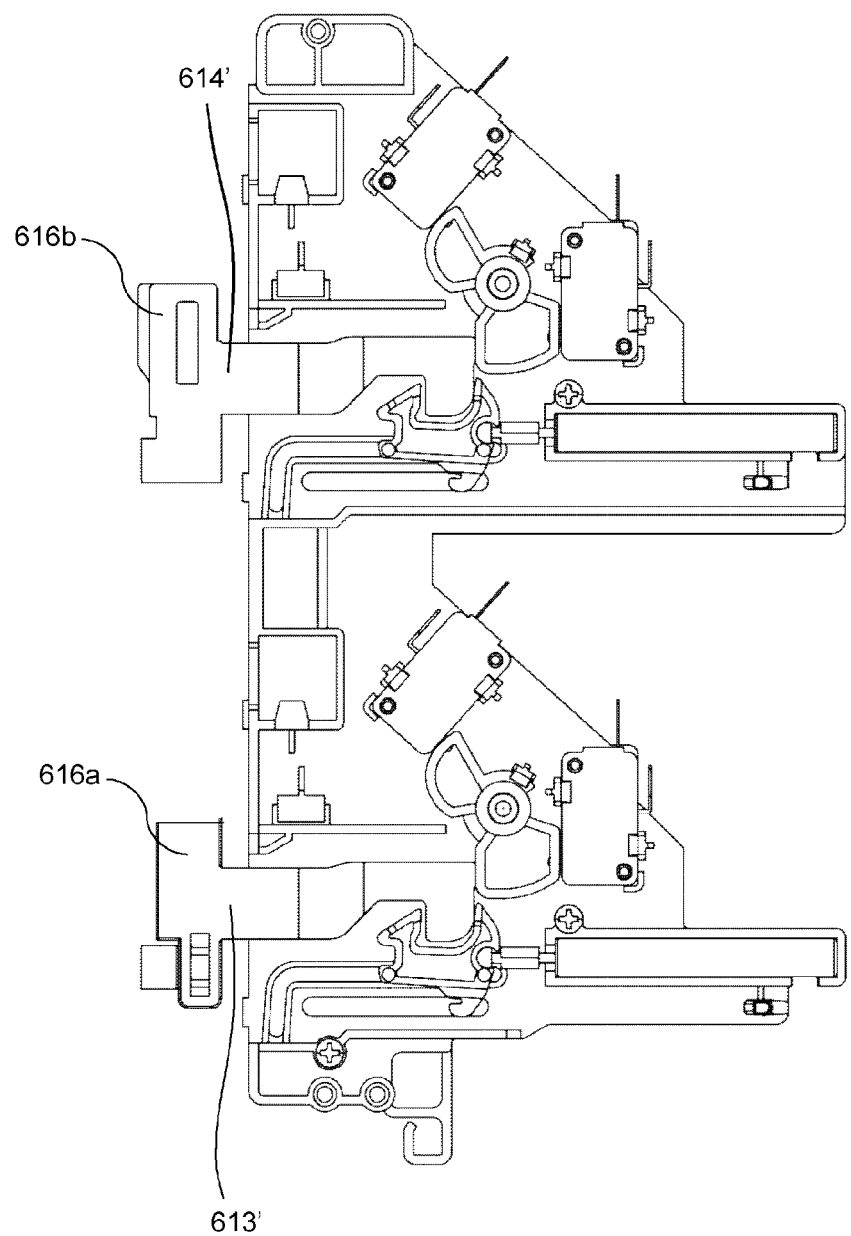

The embodiment shown in FIG. 6e is analogous to the embodiment shown in FIG. 6d except that the lower latch blade 613' and the upper latch blade 614' are not mechanically interconnected by a common bracket, but are rather carried by separate respective fixed brackets 616a, 616b.

An oven may develop an undesirable fault state if the lower latch and retraction mechanism become disengaged. In conventional soft close door systems, the catch is only capable of becoming engaged with or capturing the lower latch blade in an initial or receptive position (see FIG. 2). In some systems when the catch has been released, or advanced sufficiently without the latch blade present, it is no longer practically possible for an ordinary user to reengage them. This will prevent the oven door being closed, generates a fault and requires service. The problem is compounded by limited vertical space within the oven.

As shown in FIG. 7, one way of alleviating the aforementioned problem is by providing a track or tracks that can deflect under a load imposed by the forward guide pins 701 and rear guide pins 702. In this way, a void 709 is formed beneath the lower limb of the track 703, preferably adjacent the terminal portion 207 of the track 703, thereby to permit the lower limb of the track 703 to deflect or flex into the void/vacant space 709 when under load. Compared to the nominal vertical height of the track, the distorted height can be 50-50 percent larger. The distorted area 704 in the lower limb of the track is the result of stress imposed by the curve 705 of head 706 acting on the angled or inclined face or guide ramp 707 of the catch 700. When forcefully inserted, the head 706 will ride up the inclined face 707 of the catch 700 exerting ever more pressure on the forward guide pins 701. This causes a bulging, flexing or deformation in the lower limb of the track or tracks. This deformation is sufficient to lower the catch and thus allow the head 706 to pass into the recess or pocket 708 of the catch 700 and thereby reengage it. Once re-engagement is made and the head 706 is re-trapped, the track returns to its initial shape owing to its flexibility and elasticity or resilience.

However, during abnormal use, such as slamming the oven door, the tracks may deflect and eventually snap or fail. This can be the result of the force of the oven door closing rapidly causing the lower latch blade to ride on top of the catch instead of being received inside the pocket of the catch. In this instance, the lower latch blade would force the catch down and, as a result, over-flex the tracks causing the tracks to fail.

Figure 7A:
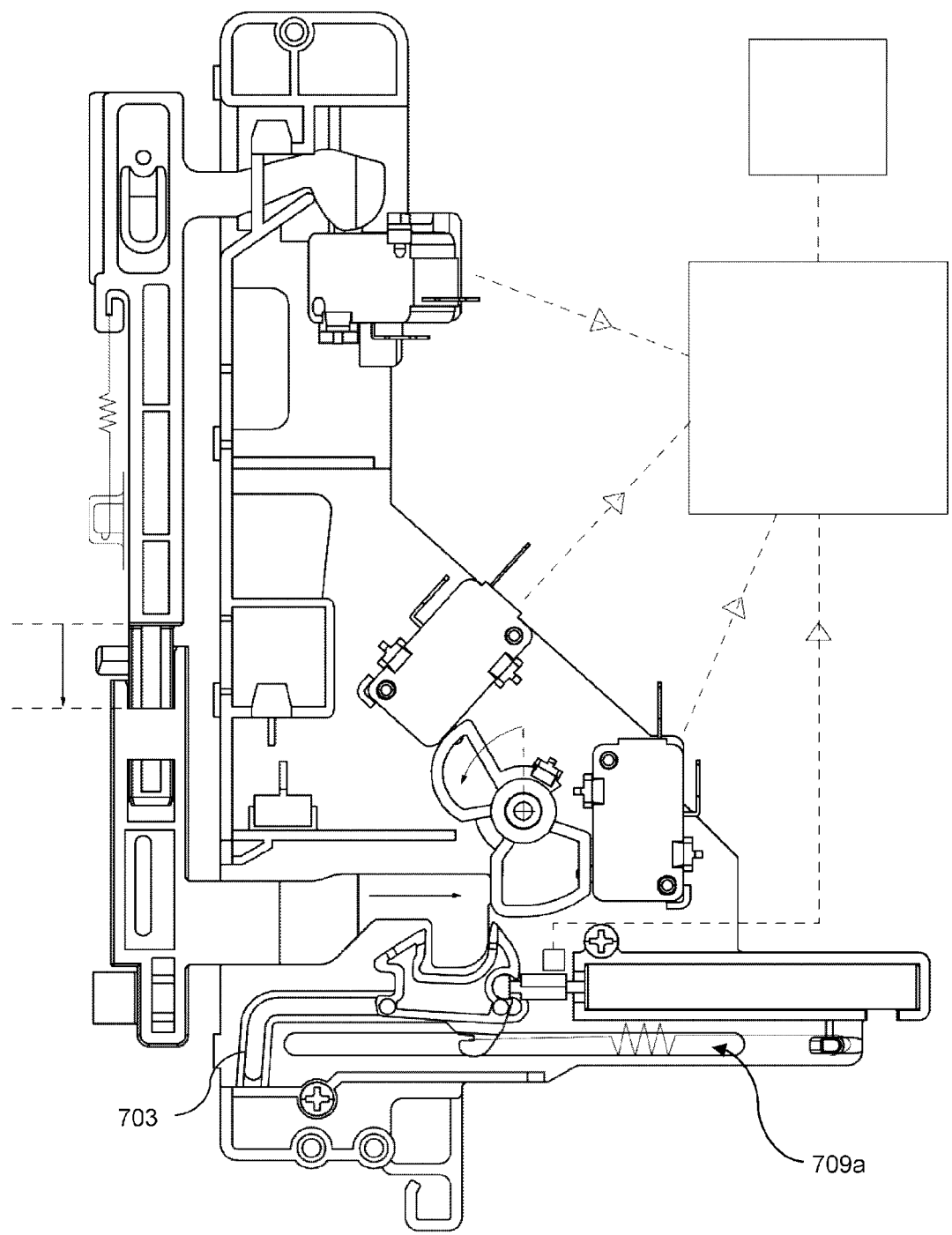
FIGS. 7a-h are schematic side elevations of the latch blade, the interlock assembly and the retraction mechanism of FIG. 2 according to alternative embodiments.
Figure 7B:
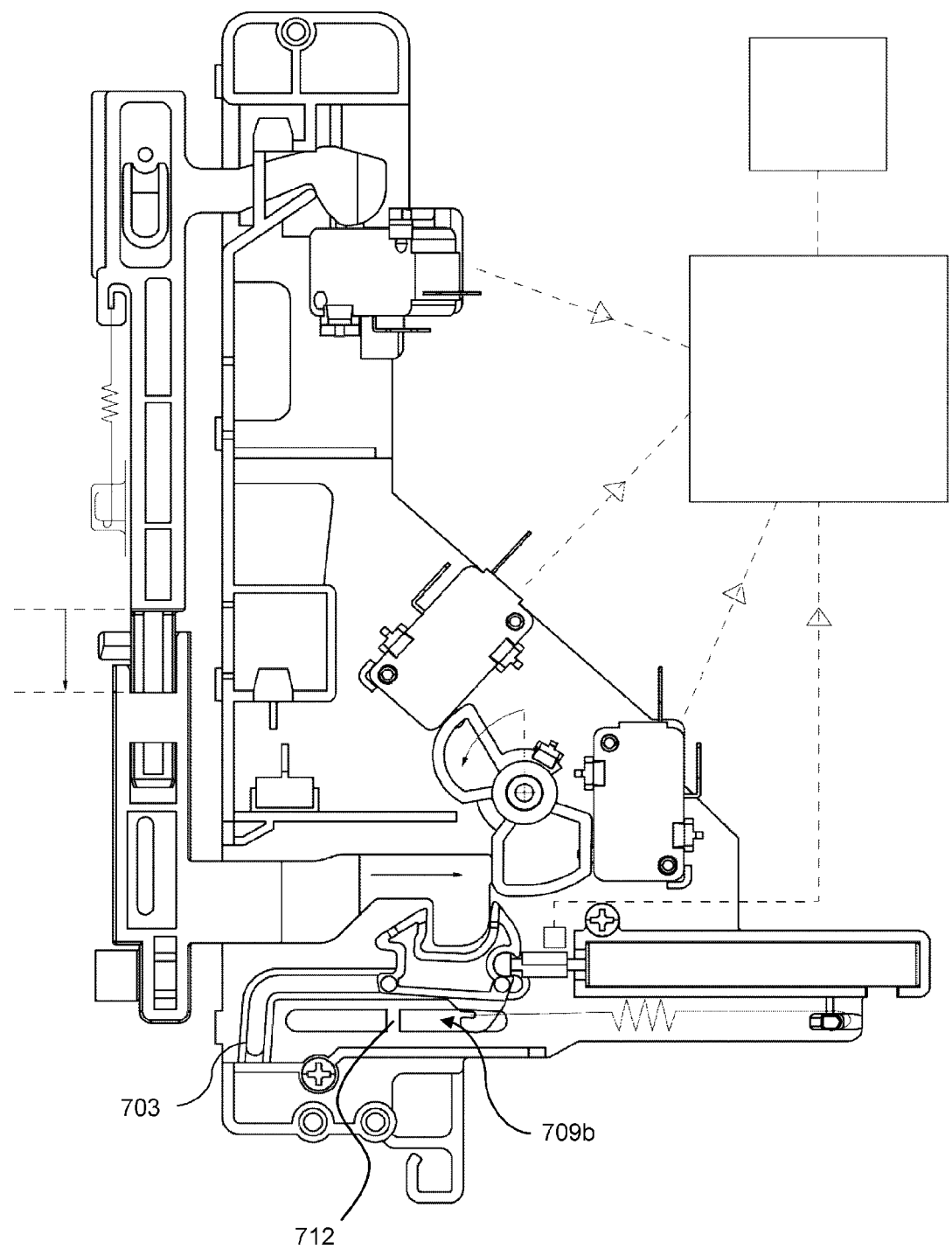
Figure 7C:
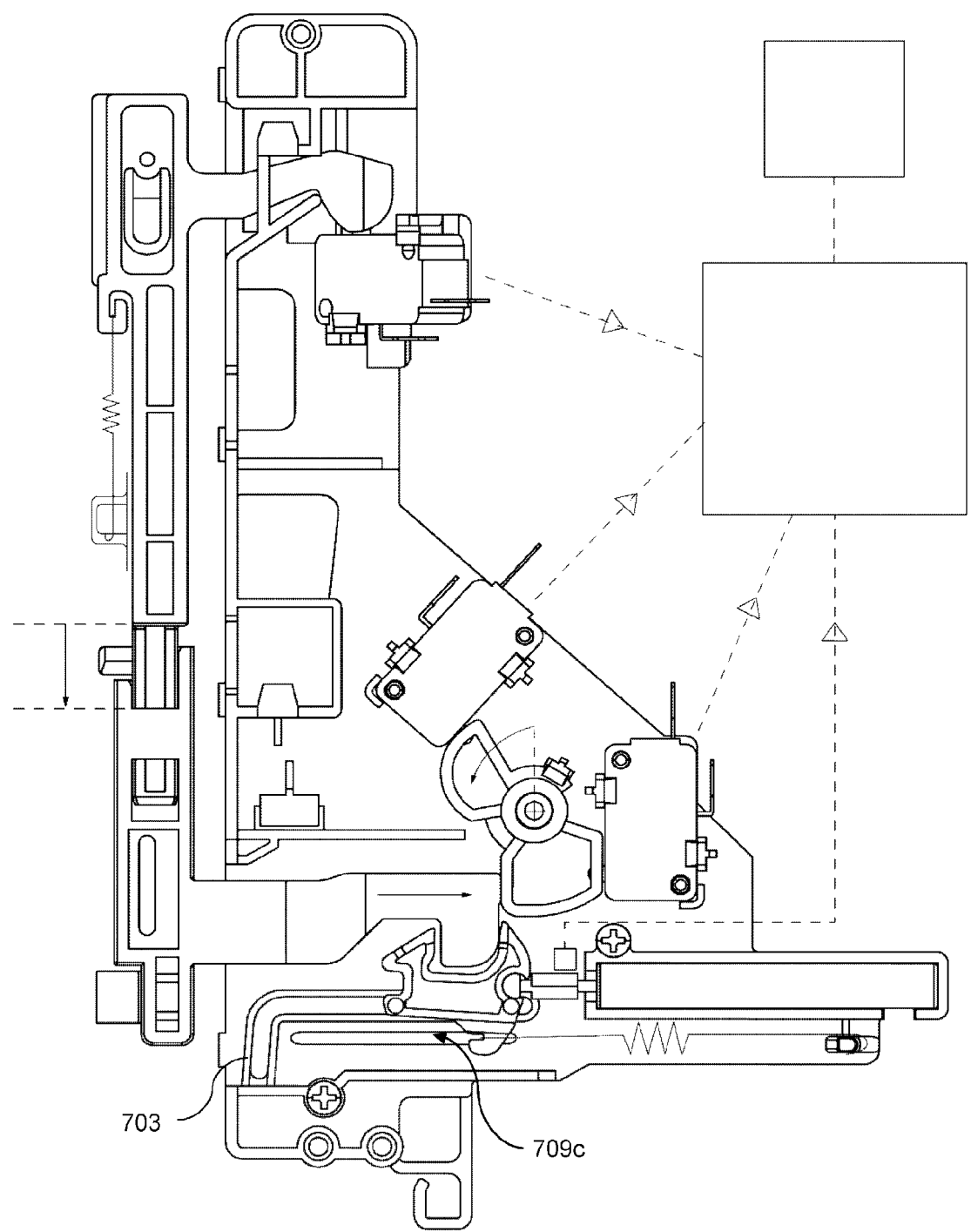
Figure 7D:
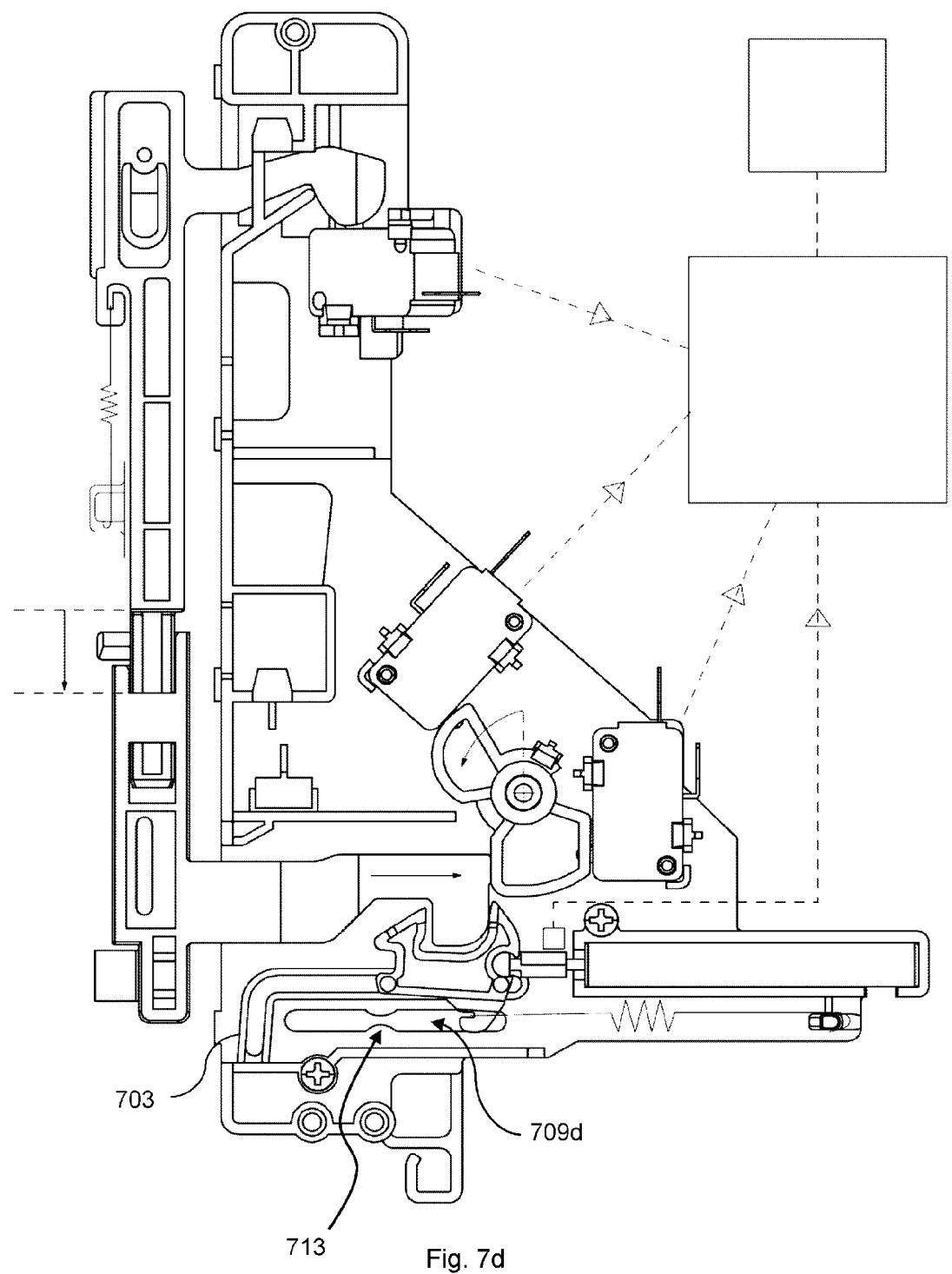
Figure 7E:
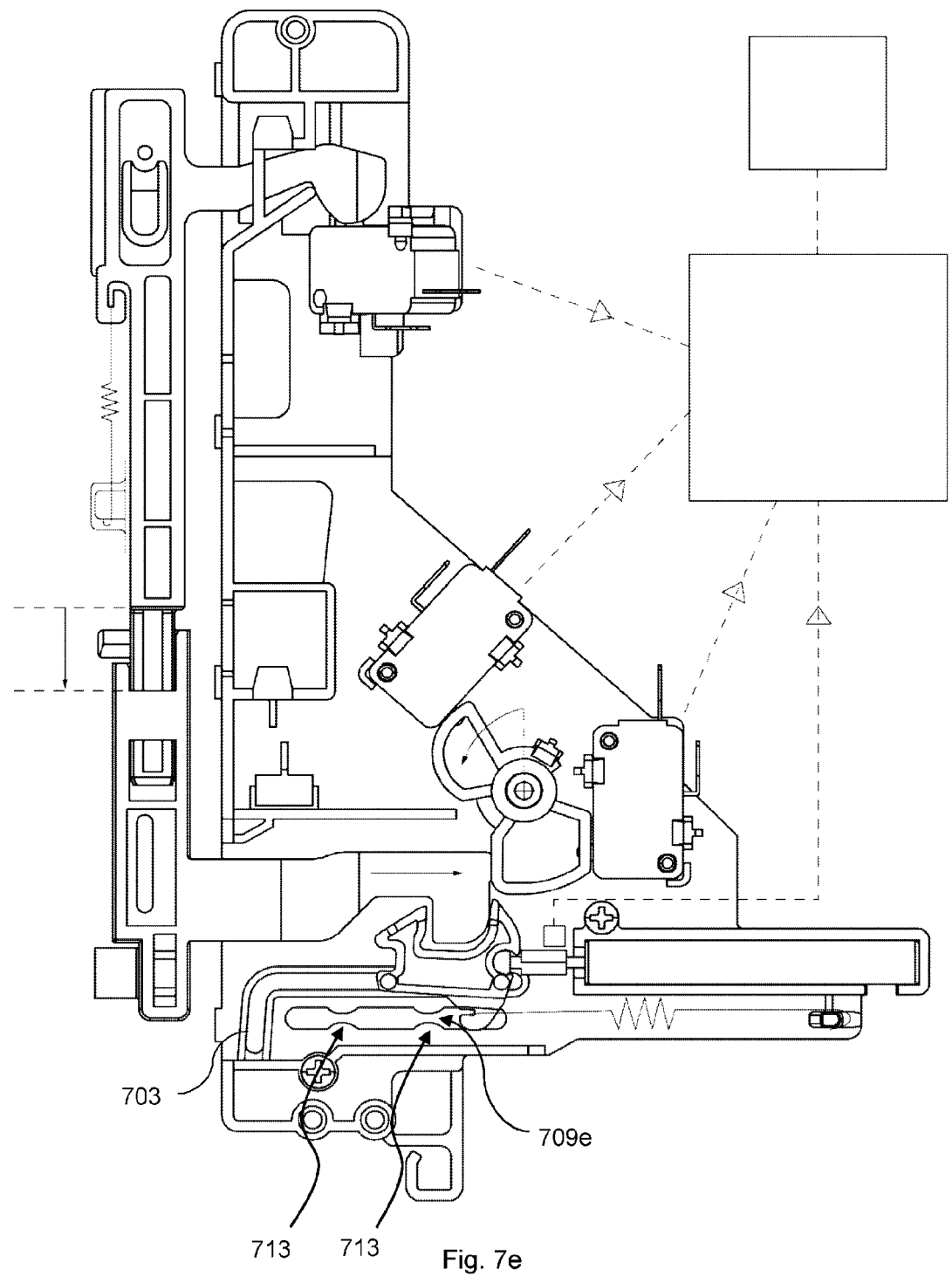
Figure 7F:
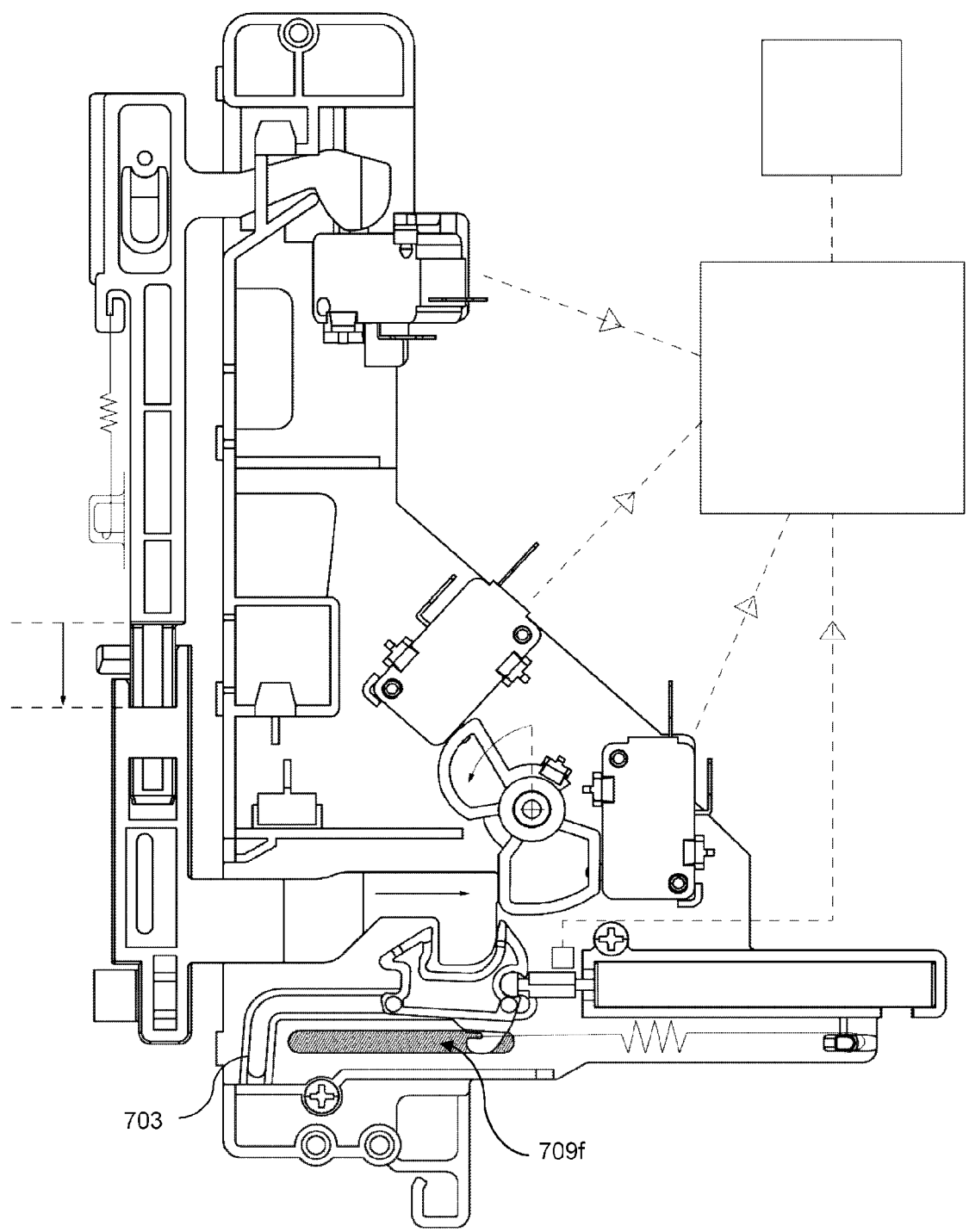
Figure 7G:
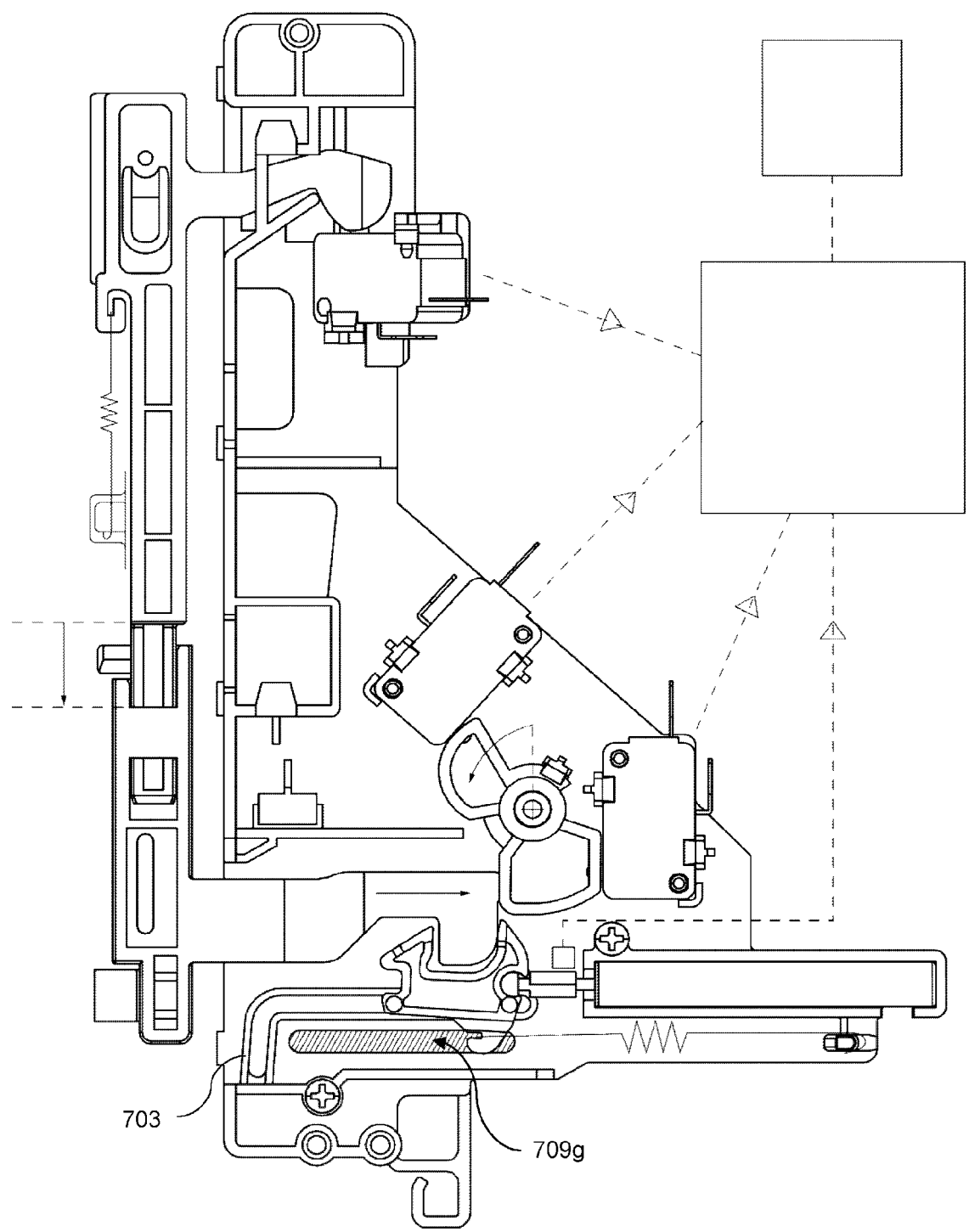
Figure 7H:
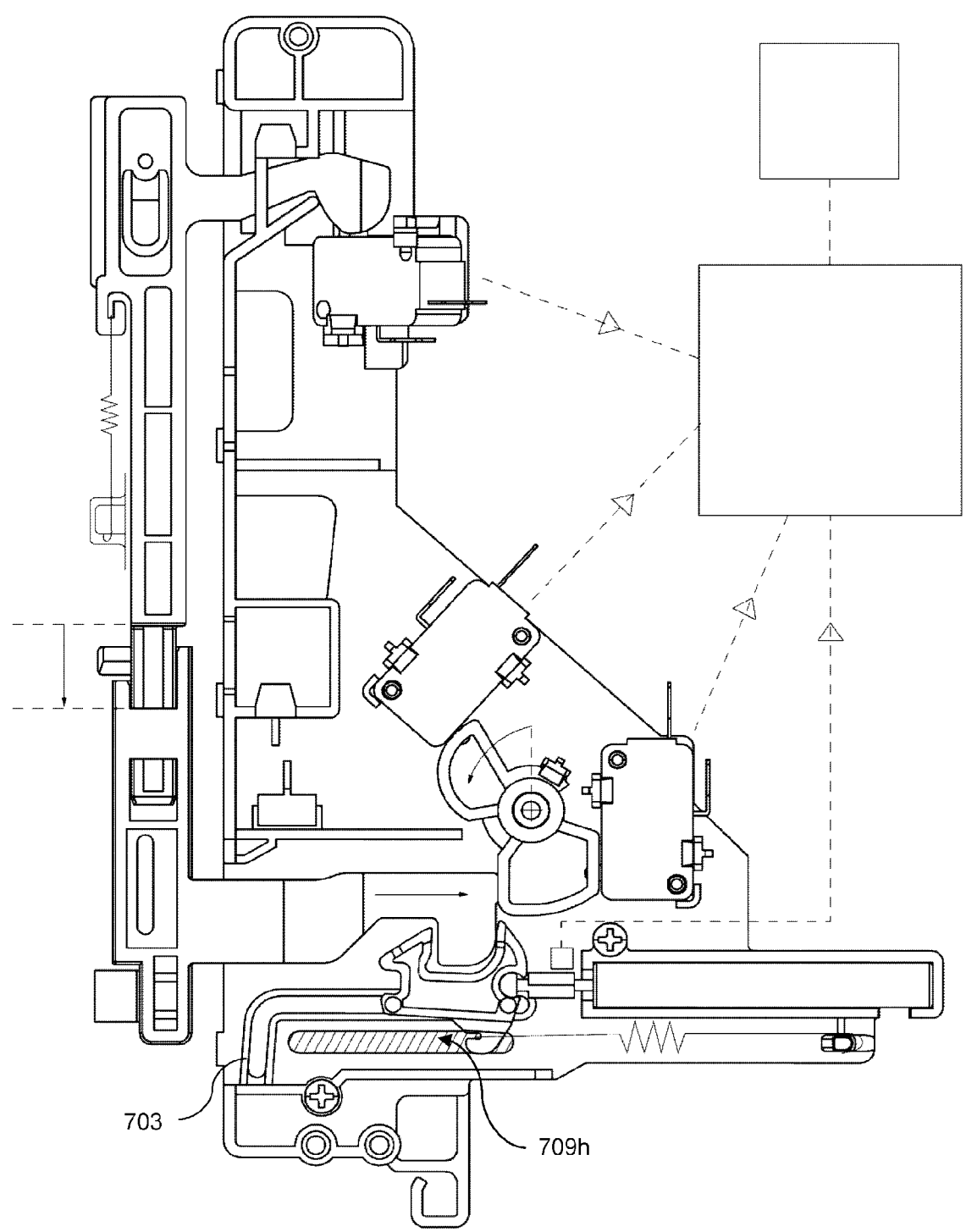

In the embodiments depicted in FIGS. 7a-h, the tendency for the tracks 703 to fail under load is minimised by altering the form and profile of the voids 709a-h as compared to the form and profile of the void 709 shown in FIG. 7. As shown in FIG. 7a, the longitudinal length of the void 709a is greater than the longitudinal length of the void 709 to transmit the load over a greater area thereby increasing the strength of the tracks 703. With reference to FIG. 7b, the void 709b is provided with a central transverse rib 712 extending across the void 709b to reduce deflection of the tracks 703. As shown in FIG. 7c, the transverse height of the void 709c is reduced relative to the transverse height of the void 709 to increase the strength of the tracks 703. With reference to FIGS. 7d and 7e, the periphery of the voids 709d, 709e are provided with one or more pairs of opposing protrusions in the form of rounded bumps 713 protruding into the void for limiting the deflection of the tracks 703. Referring to FIGS. 7f-h, the degree of deflection of the tracks 703 may be altered by filling the voids 709f, 709g, 709h with filler materials of varying densities (indicated by the degree of cross-hatching). In one or more embodiments, the filler materials may be selected from the group consisting of low-density, medium-density or high-density plastics.

In other embodiments, the tolerance of the door mounting at the vertical hinges around the pivot point may allow for sufficient vertical movement of the door 720 to assist the head 706 to pass into the pocket 708 of the catch and thereby reengage it.

Referring again to FIG. 7, a fault state is generated by the processor 109 when the catch 700 is fully retracted and the oven door is open. An oven door position sensor 710 transmits an orientation signal 711 to the device's processor 715. The position of the catch 700 may be detected using a sensor 716 such a Hall sensor, magnetic sensor, mechanical switch type sensor etc. The presence sensor 716 may be activated by a cooperating collar 717 attached to the shaft of the damper 718. When the present sensor indicates to the processor that the catch is retracted and the door presence sensor 710 indicates that the door is open, the processor may transmit a fault signal to the user interface, for example, an alert that is displayed on the graphic display 109 or otherwise.

Figure 8:
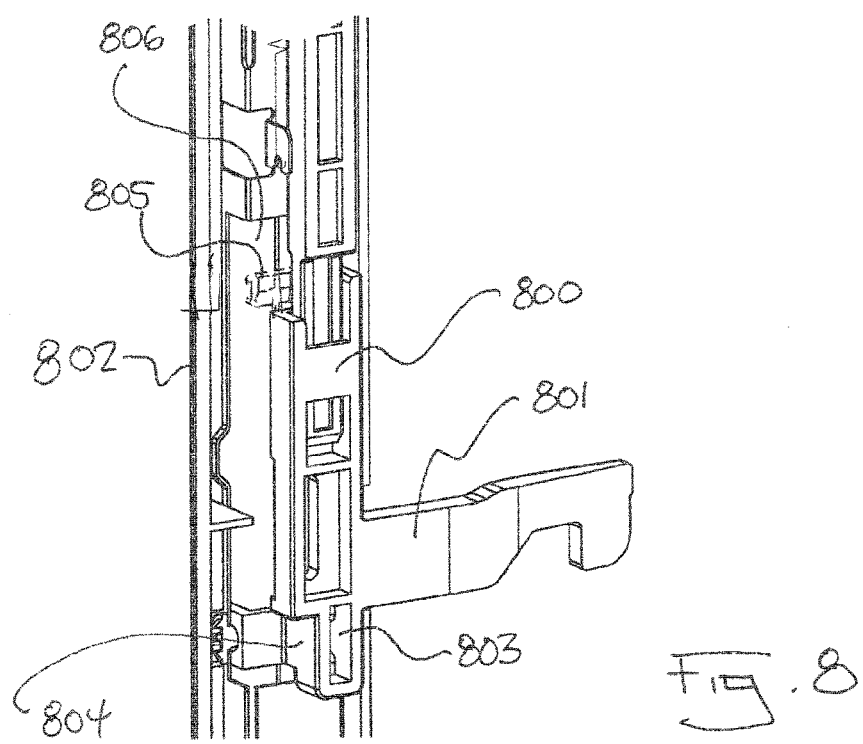
FIG. 8 is a perspective view of a lower latch blade bracket for a retractable oven door of the microwave oven of FIG. 1.

As shown in FIG. 8, the lower bracket 800 that carries the lower latch blade 801 is rigidly affixed to an oven door 802. In this example, the lower extent of the bracket 800 is affixed to the door by a fastener (806), for example carried within a cavity 803 at the lower end 804 of the lower bracket. In this example, the other end of the lower bracket is retained by a finger or tab 805 that is insertable behind a sheet metal chassis component. The finger 805 traps the upper end behind a chassis portion 806 so as to prevent flexing of the upper end of the bracket 800 about the fastener at the lower end 804.

Although the invention has been described with reference to specific examples, it will be appreciated by those skilled in the art that the invention may be embodied in many other forms.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller or computing system, or similar electronic computing or signal processing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention.

While the present invention has been disclosed with reference to particular details of construction, these should be understood as having been provided by way of example and not as limitations to the scope of the invention.

The invention claimed is:

1. A cooking appliance including:
   a hollow body having an interior to receive product to be cooked, the body having an opening via which product to be cooked can be moved relative to the interior;
   a pilot mounted within the body;
   a door attached to the body to close the opening, the door including: a first latch mounted to the door;
   a second latch mounted to the door and independently reciprocable relative to the first latch between a first position and a second position, wherein the second latch is urged to move towards the second position such that, as the door is moved to close the opening, the second latch is received within the body and is deflected towards the first position by the pilot until a portion of the second latch clears the pilot and is urged to move towards the second position to come to rest behind the pilot; and
   a retraction mechanism mounted to the body to draw the door into closure, the retraction mechanism including:
      a catch to engage the first latch; and
      a profile providing a track along which the catch moves;
   wherein the track is defined by a first sidewall and a second sidewall, wherein the first sidewall of the track is restorably deformable to increase the displacement between the first sidewall and the second sidewall at at least a portion of the track to orientate the catch to engage the first latch
   wherein the track includes:
      a parking portion proximal to the opening; and
      a terminal portion distal to the opening,
   wherein the first sidewall of the track is restorably deformable to increase the displacement between the first sidewall and the second sidewall at the terminal portion of the track.

2. The cooking appliance of claim 1, wherein the catch includes a forward protrusion and a rear protrusion, the forward protrusion and the rear protrusion locating within the track to facilitate sliding movement of the catch along the track.

3. The cooking appliance of claim 2, wherein the catch further includes a guide ramp opposite the first latch for ramped engagement with the first latch so that the first sidewall deforms under a load imposed by the protrusions.

4. The cooking appliance of claim 3, wherein a void is provided adjacent to the first sidewall to facilitate deformation of the first sidewall.

5. The cooking appliance of claim 1, wherein the catch is urged to move toward the interior of the body to come to rest at the terminal portion of the track.

6. The cooking appliance of claim 1, wherein the catch further includes a recess to receive a portion of the first latch, and wherein the recess is orientated towards the portion of the first latch as the first sidewall deforms.

7. The cooking appliance of claim 1, wherein the second latch is mounted to the door by a moveable bracket.

8. The cooking appliance of claim 7 further including a tension spring connected at one end to the moveable bracket and fixed at its other end to the door to urge the second latch to move toward the second position.

9. The cooking appliance of claim 8, wherein the first latch is fixed to the door.

10. The cooking appliance of claim 9, wherein the first latch is fixed to the door by a fixed bracket, wherein the moveable bracket has a leg to cooperate with the fixed bracket such that the first latch and the second latch are mechanically interconnected.

11. The cooking appliance of claim 1, wherein the first latch is independently reciprocable relative to the second latch.

12. The cooking appliance of claim 1, and
   further including an interlock assembly, the interlock assembly having:
      a controller to monitor various safety states of the door; and
      a plurality of safety switches each configured to be actuated to output a switch state signal to the controller based on a respective position of the door, wherein the switches are successively actuated as the door moves to close the opening.

13. The cooking appliance of claim 12, wherein the interlock assembly further includes a primary switch, a secondary switch and a monitoring switch.

14. The cooking appliance of claim 13, wherein the monitoring switch is initially actuated followed by actuation of the primary switch and the secondary switch as the door moves to close the opening.

15. The cooking appliance of claim 14, wherein the interlock assembly further includes a rotatable cam adjacent the monitoring switch and the secondary switch, the cam having a plurality of lobes to actuate the monitoring switch and the secondary switch upon rotation of the cam.

16. The cooking appliance of claim 15, wherein a first lobe of the cam initially actuates the monitoring switch, and wherein a second lobe of the cam subsequently actuates the secondary switch as the cam rotates.

17. The cooking appliance of claim 16, wherein either the first lobe or the second lobe of the cam is configured to be engaged by the first latch to rotate the cam as the door moves to close the opening.

18. The cooking appliance of claim 17, wherein the primary switch is actuated by the second latch as the secondary switch is actuated by the second lobe.

19. A cooking appliance including:
a hollow body having an interior to receive product to be cooked, the body having an opening via which product to be cooked can be moved relative to the interior;
a pilot mounted within the body;
a door attached to the body to close the opening, the door including: a first latch mounted to the door;
a second latch mounted to the door and independently reciprocable relative to the first latch between a first position and a second position, wherein the second latch is urged to move towards the second position such that, as the door is moved to close the opening, the second latch is received within the body and is deflected towards the first position by the pilot until a portion of the second latch clears the pilot and is urged to move towards the second position to come to rest behind the pilot; and
a retraction mechanism mounted to the body to draw the door into closure, the retraction mechanism including:
a catch to engage the first latch; and
a profile providing a track along which the catch moves;
wherein the track is defined by a first sidewall and a second sidewall, wherein the first sidewall of the track is restorably deformable to increase the displacement between the first sidewall and the second sidewall at at least a portion of the track to orientate the catch to engage the first latch;
wherein the catch further includes a recess to receive a portion of the first latch, and wherein the recess is orientated towards the portion of the first latch as the first sidewall deforms.

* * * * *